(12) United States Patent
Heddergott et al.

(10) Patent No.: US 7,340,257 B2
(45) Date of Patent: Mar. 4, 2008

(54) MAXIMUM LIKELIHOOD ESTIMATION OF THE CHANNEL COEFFICIENTS AND OF THE DC OFFSET IN A DIGITAL BASEBAND SIGNAL OF A RADIO RECEIVER USING THE SAGE ALGORITHM

(75) Inventors: Ralf Heddergott, München (DE); Claudiu Krakowski, Gröbenzell (DE); Martin Krüger, München (DE)

(73) Assignee: Infineon Technologies AG, Munich (DE)

( * ) Notice: Subject to any disclaimer, the term of this patent is extended or adjusted under 35 U.S.C. 154(b) by 375 days.

(21) Appl. No.: 11/193,605

(22) Filed: Jul. 29, 2005

(65) Prior Publication Data

US 2006/0052062 A1 Mar. 9, 2006

Related U.S. Application Data

(63) Continuation of application No. PCT/DE03/04277, filed on Dec. 23, 2003.

(30) Foreign Application Priority Data

Jan. 29, 2003 (DE) ................ 103 03 475

(51) Int. Cl.
*H04Q 7/20* (2006.01)
(52) U.S. Cl. ............... 455/450; 455/452.1; 455/67.11; 455/67.13; 455/63.1; 455/135; 455/143; 375/347; 375/340; 375/341; 375/260; 370/342; 370/333
(58) Field of Classification Search ............. 455/67.11, 455/67.13, 450, 452.1, 63.1, 143, 135; 370/342, 370/333, 347; 375/267
See application file for complete search history.

(56) References Cited

U.S. PATENT DOCUMENTS 5,905,721 A * 5/1999 Liu et al. ................ 370/342
5,905,946 A * 5/1999 Lilleberg et al. ........... 455/63.1
6,111,910 A * 8/2000 Cui et al. ................ 375/142
6,137,843 A * 10/2000 Chennakeshu et al. ..... 375/340
6,154,507 A * 11/2000 Bottomley ................. 375/340
6,226,321 B1 * 5/2001 Michels et al. ............ 375/227

(Continued)

FOREIGN PATENT DOCUMENTS

DE 101 37 675 A1 2/2003

(Continued)

OTHER PUBLICATIONS

"Using a Direct Conversion Receiver in Edge Terminals—A New DC Offset Compensation Algorithm", Bengt Lindoff, IEEE, May 2000, pp. 959-963.

(Continued)

*Primary Examiner*—Marceau Milord
(74) *Attorney, Agent, or Firm*—Eschweiler & Associates, LLC

(57) ABSTRACT

The proposed iterative method concurrently calculates maximum likelihood estimated values for the channel coefficients ($h_0, \ldots, h_L; \theta_h$) and the DC offset ($d; \theta_d$) on the basis of a training sequence (TSC) in a TDMA mobile communications system. The SAGE algorithm leads to two recursion formulae, by means of which the iterative calculation of estimated values for the channel coefficients ($h_0, \ldots, h_L; \theta_h$) and for the DC offset ($d; \theta_d$) is provided.

9 Claims, 2 Drawing Sheets

U.S. PATENT DOCUMENTS

| | | | |
|---|---|---|---|
| 6,449,320 B1 * | 9/2002 | Lindoff | 375/319 |
| 6,628,706 B1 * | 9/2003 | Lindoff | 375/231 |
| 6,853,681 B1 * | 2/2005 | Lindoff | 375/231 |
| 6,990,092 B1 * | 1/2006 | Siala | 370/347 |
| 7,099,409 B2 * | 8/2006 | Yousef | 375/340 |

FOREIGN PATENT DOCUMENTS

| | | |
|---|---|---|
| WO | WO 00/76160 A1 | 12/2000 |
| WO | WO 01/31867 A1 | 5/2001 |

OTHER PUBLICATIONS

"Space-Alternating Generalized Expectation-Maximization Algorithm", Jeffrey A. Fessler and Alfred O. Hero, IEEE Transactions on Signal Processing, vol. 42, No. 10, Oct. 1994, pp. 2664-2677.

International Search Report, Int'l Application No. PCT/DE03/04277, Int'l Filing Date Dec. 23, 2003, 2 pgs.

* cited by examiner

MAXIMUM LIKELIHOOD ESTIMATION OF THE CHANNEL COEFFICIENTS AND OF THE DC OFFSET IN A DIGITAL BASEBAND SIGNAL OF A RADIO RECEIVER USING THE SAGE ALGORITHM

REFERENCE TO RELATED APPLICATIONS

This application is a continuation of PCT/DE03/04277, filed on Dec. 23, 2003, which was not published in English, which claims the benefit of the priority date of German Patent Application No. DE 103 03 475.7, filed on Jan. 29, 2003, the contents of which both are herein incorporated by reference in their entireties.

FIELD OF THE INVENTION

The invention relates to a method which is used for estimation of DC interference and for simultaneous channel estimation in a digital baseband signal in a radio receiver.

BACKGROUND OF THE INVENTION

One problem during operation of radio receivers is represented by intersymbol interference that is introduced by the transmission channel. The channel distortion that is caused by the intersymbol interference may in poor transmission conditions be so severe that it is no longer possible to determine the correct data.

In the case of time division multiplexing methods (TDMA; Time Division Multiple Access) such as GSM (Global System for Mobile Communications) or EDGE (Enhanced Data Rates for GSM Evolution), the channel equalization process is carried out by means of so-called training sequences. In a time-division multiplexing method, the data symbols which carry the information are transmitted in successive data bursts. In order to carry out a channel estimation process, followed by channel equalization, each data burst additionally contains a training sequence, which in each case has a predetermined pseudo-random data sequence. The training sequences are likewise stored in a memory at the receiver end. The radio receiver can thus use the training sequences received from the radio transmitter and the training sequences obtained from the memory for channel estimation. The channel estimation process is carried out by calculation of so-called channel parameters or channel coefficients. In a channel equalizer, the channel parameters are used in order to reconstruct the data symbols transmitted from the radio transmitter from the signals received by the radio receiver.

A further problem during operation of radio receivers is that DC components occur in the received signal for various reasons in the radio receiver. These DC components are referred to in the following text as the DC offset (Direct Current) or as DC interference, in accordance with the conventional nomenclature. The DC interference cannot be eliminated completely, even in high-quality radio receivers, and must therefore be estimated and corrected during the baseband signal processing. Otherwise, the DC interference would adversely affect the equalization of the received signal, and would lead to an increased bit error rate in the radio receiver.

The simplest approach for estimation of the DC interference is to average two or more data bursts over the baseband symbols. However, this method often leads to very inaccurate results in the situation where the DC interference changes with each data burst. This is the situation in particular in the case of a network frequency hopping method. In the case of frequency hopping methods, the DC interference must therefore be estimated individually for each data burst. However, for example in the case of the GMSK method (Gaussian Minimum Shift Keying) and in the case of the 8-PSK method (Phase Shift Keying), for example, it is not possible to estimate the DC interference by averaging over only one data burst, since averaging over only a small number of baseband symbols is generally not equal to zero in the case of these methods. In consequence, it is not possible to distinguish between an inherently occurring discrepancy in the mean value from the zero point and DC interference which has been caused by the receiver.

A further approach for estimation of the DC interference is to represent the baseband symbols as a circle on the complex numerical plane. In this case, DC interference causes a shift in the center of the circle. This shift can be detected by determining the associated circle from the received baseband symbols using a least-squares method. This approach has the disadvantage that it cannot be used for the 8-PSK method which is used, for example, in EDGE receivers.

FIG. 1 shows the procedure for a conventional method for compensation for the DC interference and for channel equalization, in a schematic form. In this case, the DC interference on the signals received in the radio receiver is estimated first of all, and this is then compensated for. The signals which are now no longer subject to any DC interference are now used together with the training sequence to calculate the channel parameters. The channel parameters are passed to a channel equalizer, which carries out the channel equalization process.

FIG. 2 shows a further method, which is likewise known, for compensation for the DC interference and for channel equalization, in schematic form, which is described in the article "Using a direct conversion receiver in EDGE terminals: A-new DC offset compensation algorithm" by B. Lindoff, which appeared in the journal Proc. IEEE PIMRC, 2000, pages 959-963. This method allows the estimation of the DC interference as well as the channel estimation process to be carried out at the same time. The fundamental idea of the method is to regard the DC interference as an additional unknown parameter in the fundamental channel model, and to include the estimation of the DC interference in the channel estimation process. The DC interference and the channel parameters which have been determined in this way are then passed to a unit for compensation for the DC interference and to a channel equalizer. The joint estimation of the DC interference with the channel estimation can be used for all types of modulation. This method according to B. Lindoff has the disadvantage, however, that it requires a large amount of read only memory and involves a large amount of computation complexity.

The German Patent Application DE 101 37 675.8 describes a method for estimation of the DC interference and for channel estimation in a digital baseband signal in a radio receiver. In this method, the channel parameters for the channel estimation process are first of all calculated by means of a least-squares method using a training sequence that is known in the receiver, and ignoring the DC interference. The DC interference is then estimated and the channel estimation process is carried out, with correction terms for the channel parameters being calculated for the estimation process, taking into account the DC interference. This method makes use of the fact that the training sequence TSC in GSM is real, so that the majority of the so-called Fisher information matrix is real. However, this procedure still has the disadvantage that this matrix must be stored. Since a number of training sequences are defined, a set of 8 matrices must be stored. If it is intended to take into account an even greater number of channel lengths, the number of stored matrices is multiplied accordingly.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

The present invention is directed to a method for estimation of the channel coefficients and the DC offset in a digital baseband signal in a radio receiver, whose memory requirement and computation complexity are reduced, with at least comparable efficiency, in comparison to the prior art.

One embodiment of the invention is to use a training sequence which is known to the radio receiver, and carry out a maximum likelihood estimation process in the estimation method, but not to calculate its entire parameter space in order to find the maximum of the likelihood function, but to use an iterative method on the basis of the SAGE algorithm (Space Alternating Generalized Expectation Maximization). The SAGE algorithm is based on the subdivision of the parameter set of the likelihood function into subsets and on the production of dedicated likelihood functions for each of these parameter subsets. If the parameter subsets are chosen appropriately, the expected value determination step provided in the SAGE algorithm and the maximization step can be combined with one another in such a way that two recursion formulae are produced for the expected values of the parameter subsets. These recursion formulae provide a generally rapidly converging sequence of expected values for the parameter subsets. In one embodiment of the invention, the parameter set is subdivided in a suitable manner into parameter subsets for the channel coefficients and the DC offset.

The method according to the invention has the advantage that it represents an efficient method for obtaining the channel coefficients and the DC offset, without in the process having to store a number of relatively large matrices in a complex manner. Since the method according to the invention generally requires only a small number of iteration steps before convergence is reached on the basis of predetermined criteria, the computation complexity for this method is also kept within limits.

Furthermore, the method according to the invention has as a further advantage over other methods that are used for the same purpose that it can be used for all types of modulation, such as GMSK or 8-PSK.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The invention will be explained in more detail in the following text with reference, by way of example, to the drawings, in which.

DETAILED DESCRIPTION OF THE INVENTION

Figure 1:
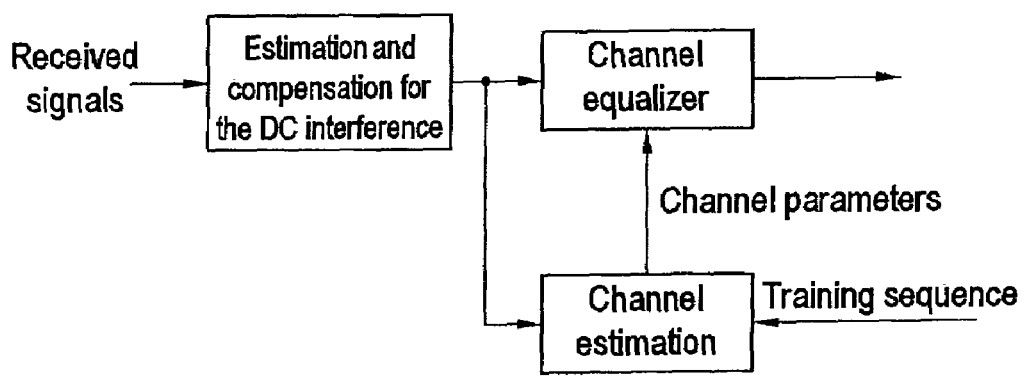
FIG. 1 is a schematic illustration of a conventional method for compensation for DC interference, and for channel equalization.
Figure 2:
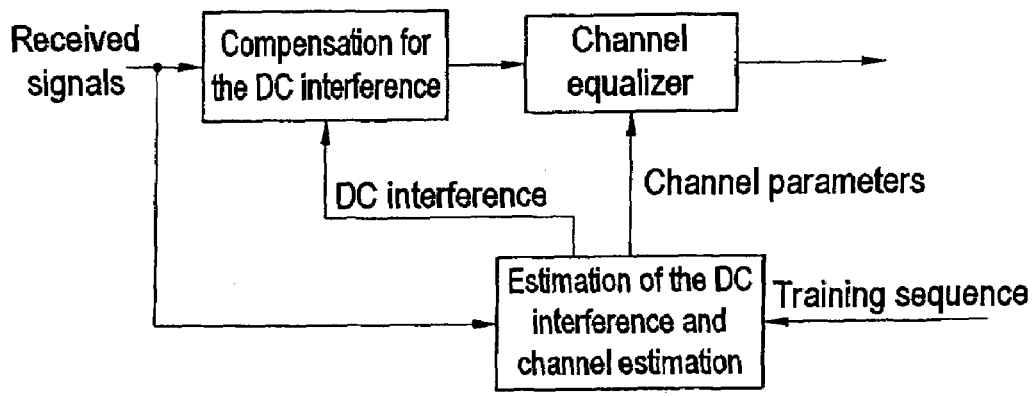
FIG. 2 is a schematic illustration of a further conventional method for compensation for DC interference and for channel equalization.
Figure 3:
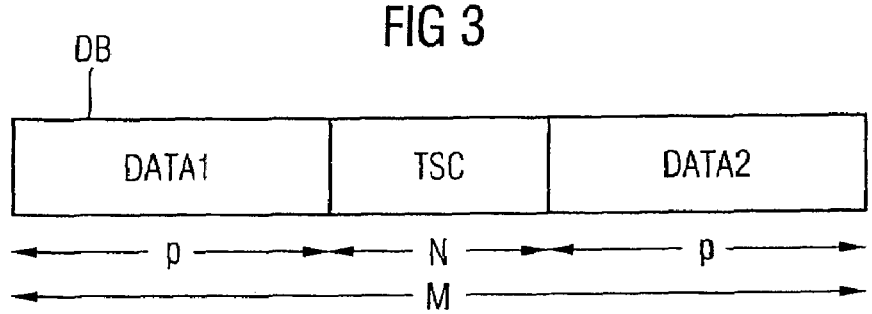
FIG. 3 is a schematic illustration of a data burst with a training sequence.

FIG. 3 shows a data burst DB which contains M data symbols. The data burst DB is transmitted from a radio transmitter and is received by a radio receiver. p data symbols DATA1 are transmitted at the start of the data burst DB. N data symbols of a training sequence TSC are then transmitted following which, provided that the training sequence TSC is located precisely in the center of the data burst DB, p data symbols DATA2 are transmitted, such that M=2p+N. The data symbols DATA1 and DATA2 contain the payload data to be transmitted.

The data symbols in the data burst DB are subject to DC interference and distortion, which is caused by intersymbol interference, after reception in the radio receiver. The training sequence TSC is used to equalize the payload data, which has been transmitted by means of the data symbols DATA1 and DATA2. The training sequence TSC contains a pseudo-random data sequence which has been agreed in advance and is known both to the radio transmitter and to the radio receiver. The training sequence TSC can therefore be used to calculate the channel distortion.

The original data symbols in the data burst DB, present in the radio transmitter, are annotated s(k) (k=0, 1, . . . , M-1) where k represents a numbering index for each data symbol s(k) to be transmitted. Owing to the time sequence of the successive transmission of the data symbols s(k), k also corresponds to the time at which the data symbol s(k) was transmitted. The data symbols s(k) thus comprise both the data symbols DATA1 and DATA2 as well as the data symbols in the training sequence TSC. Before the transmission of the data burst DB, the data symbols s(k) are transformed to rotated data symbols $\tilde{s}(k)$ in a modulator using the phase angle $\Phi$:

$$\tilde{s}(k)=s(k)\cdot e^{j\Phi k} \text{ where } k=0, 1, \ldots, K\text{-}1 \qquad (1)$$

The phase angle $\Phi$ is in this case dependent on the modulation method that is used. For example, it is $\pi/2$ for the GMSK method, and is $3\pi/8$ for the 8-PSK method. The data symbols s(k) in the GMSK method assume the values -1 or +1. In the 8-PSK method, the data symbols s(k) are generally complex, while the values in the training sequence TSC are restricted to the values -1 and +1.

The signal in equation (1) is transmitted via the radio channel which is described by the channel impulse response with L+1 components $$\tilde{h}(k) = \sum_{l=0}^{L} \tilde{h}_l \delta(k-l), \quad (2)$$

where $\delta(k)$ is the Kronecker-Delta impulse response.

The radio receiver receives data symbols $\tilde{x}(k)$ by means of the data burst DB:

$$\tilde{x}(k) = \sum_{l=0}^{L} \tilde{h}_l \cdot \tilde{s}(k-l) + \tilde{d} + \tilde{n}(k), \quad k=0,\ldots,K-1. \quad (3)$$

Equation (2) is based on a channel model in accordance with which the rotated data symbols $\tilde{s}(k)$ interfere in the transmission channel. This results in the sum in the first term of equation (2). L in this case represents the channel order and $\tilde{h}_l$ the channel parameters. The channel model also takes account of DC interference $\tilde{d}$.

Furthermore, the data symbols $\tilde{x}(k)$ are subject to an additive noise component $\tilde{n}(k)$ that is produced by the transmission. The observed baseband signal contains $K \geq M$ samples, based on the assumption that the total relevant signal energy for detection of the data in a burst is contained within the observation of length K.

After reception of the data symbols $\tilde{x}(k)$, these are back-transformed by means of the phase angle $\Phi$ to backward-rotated data symbols $x(k)$:

$$x(k) = \tilde{x}(k) \cdot e^{-j\Phi k}$$

The combination of the equations (1), (2) and (3) for the backward-rotated data symbols $x(k)$ results in the following equation:

$$x(k) = e^{-j\Phi k} \left[ \sum_{l=0}^{L} \tilde{h}_l \cdot \tilde{s}(k-l) + \tilde{d} + \tilde{n}(k) \right], \quad (4)$$

$$= \sum_{l=0}^{L} h_l \cdot s(k-l) + \tilde{d} \cdot e^{-j\Phi k} + \tilde{n}(k) e^{-j\Phi k},$$

where use is made of the definition $h_l := \tilde{h}_l e^{-j\Phi l}$.

The data symbols $t(m)$ in the training sequence TSC are likewise corrupted in the same way as the payload data during radio transmission by intersymbol interference and DC interference. I is intended to denote the index of the first signal sample, which is dependent on TSC. If it is assumed that I is known as a result of a synchronization algorithm, the TSC-dependent part of the received signal can be described by the following equation:

$$y(k) = x(k+I) \quad (5)$$

$$= \sum_{l=0}^{L} h_l \cdot t(k-l) + d \cdot e^{-j\Phi k} + n(k),$$

$$k = L, \ldots, N-1.$$

In this case, backward-rotated DC interference is defined by the expression $d := \tilde{d} \cdot e^{-j\Phi p}$ and $n(k) := \tilde{n}(k+I)e^{-j\Phi(k+I)}$.

The first and the last L signal samples of $y(k)$ are influenced by the data symbols which are adjacent to the training sequence TSC. The part of the received TSC which can be used for channel estimation is thus formed by the signal samples in the interval $y(L) \ldots y(N-1)$.

A vector transmission model which allows more compact notation of the estimation problem is formulated in the following text.

The received signal vector is defined as:

$$y = [y(L), \ldots, y(N-1)]^T, \quad (6)$$

where $[.]^T$ denotes the matrix transposition. Furthermore, we define the (N-L×L+1) channel transmission matrix as $$T = \begin{bmatrix} t(L) & \cdots & t(0) \\ \vdots & \ddots & \vdots \\ t(N-1) & \cdots & t(N-L-1) \end{bmatrix} \quad (7)$$

and the (N-L×1)DC offset transmission matrix as $$a := [e^{-j\Phi L}, \ldots, e^{-j\Phi(N-L)}]^T. \quad (8)$$

The noise vector is referred to as $N := [n(L), \ldots, n(N-1)]^T$. The channel coefficients and the DC offset are defined as $\theta_h := [h_0, \ldots, h_L]^T$ and $\theta_d := d$.

Using these definitions, we can write the following simple expression for the received signal vector.

$$y = T\theta_h + a\theta_d + N \quad (9)$$

Furthermore, it is useful to produce an even more compact form. We thus define the transmission matrix and the parameter vector as $$A := [T, a]$$

and $$\theta := \begin{bmatrix} \theta_h \\ \theta_d \end{bmatrix}.$$

Using this notation, we can write equation (9) as $$y = A\theta + N. \quad (10)$$

As can be seen, the channel transmission matrix T is a real matrix, while A is complex.

The present problem is to find the maximum likelihood (ML) estimate of the parameter vector $\theta = [h_0, h_1, \ldots, h_L, d]^T$. Based on the publication "An Introduction to Signal Detection and Estimation" by H. V. Poor, New York, N.Y., Springer, 2nd ed. 1994, the log-likelihood required function is:

$$\tilde{\Lambda}(\theta) = \frac{1}{2}(y - A\theta)^H \Pi^{-1}(y - A\theta), \quad (11)$$

where $\Pi$ denotes the covariance matrix of the noise vector, and $[.]^H$ denotes the conjugate transposition. Since it is assumed that the signal samples of the noise vector include white noise, the noise covariance matrix is a diagonal matrix with the noise variance $\sigma^2$ on its diagonal elements. Since the maximization does not depend on $\sigma^2$, and thus not on $\Pi$, equation (11) can be simplified to $$\Lambda(\theta) := -(y - A\theta)^H(y - A\theta). \quad (12)$$

The ML estimated value is the value of the parameter vector for which equation (12) reaches a maximum:

$$\hat{\theta}_{ML} = \frac{\arg\max\{\Lambda(\theta)\}}{\theta}. \qquad 5$$

A very complex method for finding the ML estimated value could comprise $\Lambda(\theta)$ being calculated for the entire parameter space $\theta$ or a subspace of it, and the maximum being found. However, this is impracticable since it would be necessary to search an (L+2)-dimensional parameter space.

The estimation problem is advantageously linear, and one solution thus exists, in the following closed form:

$$\hat{\theta}_{ML}=(A^H A)^{-1}A^H y. \qquad (13)$$

In this case, the expression $F=(A^H A)$ is referred to as the Fisher information matrix. Equation (13) is the known estimate of the least square errors, as has been described in the publication cited initially by B. Lindoff.

Although the solution in Equation (13) requires a great deal less complexity than the complex searching, as described above, of the entire parameter space of the likelihood function in Equation (12), it is still unsuitable for being implemented in a mobile station.

The approach according to the invention of an iterative algorithm for solving equation (12) will be derived in the following text. This algorithm is based on the SAGE algorithm (Space-Alternating Generalized Expectation Maximization). The SAGE algorithm has been described, by way of example, in the publication "Space-Alternating Generalized Expectation Maximization Algorithm" by J. A. Fessler and A. O. Hero in IEEE Trans. on Signal Processing, vol. 42, No. 10, October 1994, and is hereby incorporated by reference in its entirety. For an algorithm such as this, it is known that the sequence of estimated values achieved by the iteration steps increases the log-likelihood-required function in equation (12) monotonally.

The SAGE method is based on subdivision of the parameter set into subsets. We choose $$y_h:=T\theta_h+N$$

$$y_d:=a\theta_d+N \qquad (14)$$

as the data spaces which are in each case associated with the parameter subsets $\theta_h$ and $\theta_d$. It can easily be shown that equation (14) relates to the definition of an "Admissible Hidden-Data Space", as has been described in the publication cited above by Fessler et al.

The expected values of each of the log-likelihood functions $Q_h(\theta_h, \hat{\theta}')$ and $Q_d(\theta_d, \hat{\theta}')$ are calculated in the expected value determination step (E step) based on the knowledge of the received data vector y and an estimated value of the parameter vector $\hat{\theta}'=[\hat{\theta}'_h, \hat{\theta}'_d]^T$. This last-mentioned estimated value may be an estimated value of the parameter vector which has been obtained in a previous iteration step. Thus, first of all:

$$Q_h(\theta_h;\hat{\theta}') = \frac{1}{2}(\hat{y}_h - T\theta_h)^H \Pi^{-1}(\hat{y}_h - T\theta_h) \qquad (15)$$

$$Q_d(\theta_d;\hat{\theta}') = \frac{1}{2}(\hat{y}_d - a\theta_d)^H \Pi^{-1}(\hat{y}_d - a\theta_d),$$

where $$\hat{y}_h=y-a\hat{\theta}_d'$$

$$\hat{y}_d=y-T\hat{\theta}_h'$$

are the estimated values of the concealed data.

The equations (15) are in each case maximized for $\theta_h$ and $\theta_d$ in the maximization step (M step). The values with which the equations (15) are maximized can be calculated in a closed form. This results in the following recursion equations for $\theta_h$ and $\theta_d$ with the given estimated value $\hat{\theta}'$:

$$\hat{\theta}_h''=(T^H T)^{-1}T^H(y-a\hat{\theta}_d') \qquad (16)$$

$$\hat{\theta}_d''=(a^H a)^{-1}a^H(y-T\hat{\theta}_h''). \qquad (17)$$

The equation (17) may also be solved before the equation (16) in order to calculate the estimated values.

Figure 4:
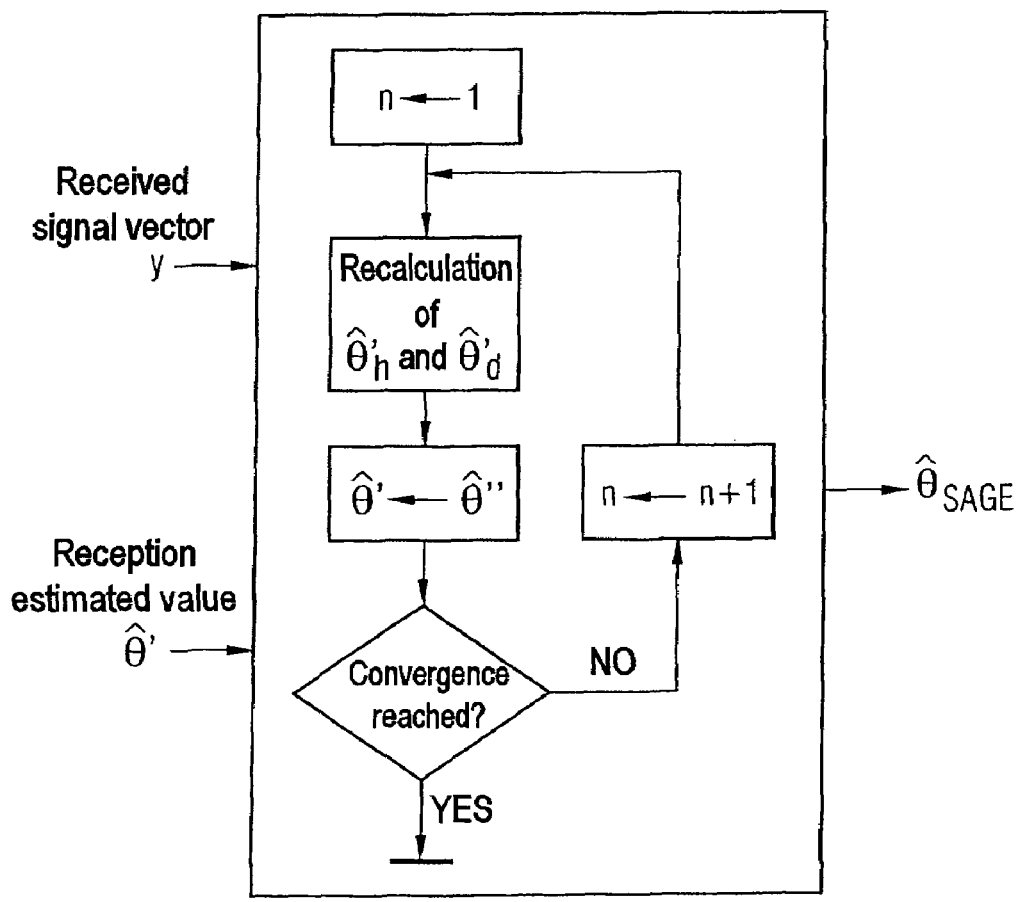
FIG. 4 is a flowchart illustrating an iteration of the method according to the invention.

FIG. 4 shows a flowchart for the iterative reassessment of the maximum-likelihood (ML) estimated value. The procedure starts with the observed signal vector y and with an initial estimated value $\hat{\theta}'$ of the parameter vector. The initial estimated value is improved by carrying out the reassessment algorithm in accordance with equations (16) and (17), and converges in the direction of the ML estimated value. The reassessment algorithm is ended once a predetermined convergence criterion is satisfied.

As has been shown above, the use of the SAGE method for calculation of the ML estimated value in the equation (12) leads to the expected value determination step and the maximization step being combined with one another, leading to the recursion equations (16) and (17). An initial value $\hat{\theta}_d'$ for the DC offset can be substituted in equation (16) in order subsequently to carry out the recalculations using both equations in a specific number of iteration steps. The monotonal characteristic of the SAGE algorithm in the publication by Fessler et al. is guaranteed in that the log-likelihood values which can be calculated from the estimated values of the individual iteration steps form a non-falling sequence. Very rapid convergence is achieved in practice, so that the initially used estimated values need be reassessed only for a small number of iteration cycles.

The initially used value should as far as possible be close to the maximum of the log-likelihood function so that the sequence of the estimated values can converge in this direction. The monotonal characteristic is ensured in that the sequence of the estimated values does not diverge but does not necessarily guarantee that convergence to an absolute or local maximum of the likelihood function will occur.

The algorithm can be started by substituting $\hat{\theta}'_d=0$ in equation (16) and then carrying out the reassessments of the equations (16) and (17). The initial estimated values are formed by $$\hat{\theta}_h'=(T^H T)^{-1}T^H y \qquad (18)$$

$$\hat{\theta}_d'=(a^H a)^{-1}a^H(y-T\hat{\theta}_h') \qquad (19)$$

After these steps, the reassessment procedure for the equations (16) and (17) can be continued until the predetermined convergence criterion is satisfied.

One exemplary embodiment of the method according to the invention will be described in the following text. In this exemplary embodiment, the channel coefficients are estimated on a length of only 16 data symbols. In this case, the orthogonality of the TSC sequence is used for $L \leq 6$. As a consequence of this, $F^{-1}$ is a scaled unit matrix.

Use is therefore made of the following channel transmission matrix on the basis of 16 observed TSC symbols $$T_{short} := \begin{bmatrix} t(L) & \cdots & t(0) \\ \vdots & \ddots & \vdots \\ t(L+15) & \cdots & t(15) \end{bmatrix} \quad (20)$$

and the DC offset transmission matrix $$a_{short} = [e^{-j\Phi L}, \ldots, e^{-j\Phi(L+15)}]^T \quad (21)$$

Furthermore, a subvector of the received signal vector $y_{short} = [y(L), \ldots, y(L+15)]^T$, comprising 16 symbols, and a noise vector $N_{short} = [n(L), \ldots, n(L+15)]^T$ are defined.

In addition, use is made of the "long version" of the vector transmission model on the basis of the observed signal of length N-L, as described further above. N-L>16 is obtained for a suitable value of $L \leq 6$.

The initialization produced using the equations (18) and (19) is modified as follows. First of all, estimated values of $\theta_h'$ are obtained on the basis of an observed signal of 16 data symbols:

$$\hat{\theta}_h' = T_{short}^H y_{short}. \quad (22)$$

An estimated value for the DC offset is then proposed in a closed form, as proposed in the initially mentioned document DE 101 37 675.8, calculated on the basis of an observed signal with a length of N-L data symbols:

$$\hat{\theta}_{d'} = \frac{1}{\|a\|^2 - a^H T(T^H T)^{-1} T a}(a^H y - a^H T(T^H T)^{-1} T y). \quad (23)$$

The advantage of using an expression of the ML estimated value in a closed form on an observation interval of length N-L data symbols is improved accuracy compared to an estimated value based on an observation interval of 16 symbols. As will be shown further below, the calculation of equation (23) does not place any stringent demands on the amount of memory required or on the computation complexity.

If $\hat{\theta}_h'$ and $\hat{\theta}_d'$ are available, $\hat{\theta}_h''$ is calculated using equation (16):

$$\hat{\theta}_h'' = T_{short}^H(y_{short} - a_{short}\hat{\theta}_d') = \hat{\theta}_h' - T_{short}^H a_{short}\hat{\theta}_d' \quad (24)$$

This calculation produces an improvement in the initial estimated value corresponding to equation (22) as a result of the monotonal characteristic of the SAGE algorithm. The estimated value of the DC offset requires no further improvement, since equation (23) already represents the ML estimated value in a closed form. The following text will consider the storage requirements and the computation complexity with regard to the stored words and the real-real multiplication operations. It is assumed that a real variable fills a stored word, with two complex variables filling two stored words. Furthermore, the values for all 8 TSC must be stored for a matrix which is dependent on TSC. With regard to the computation complexity, it is assumed that a real-complex multiplication is equivalent to two real-real multiplication operations, and that a complex-complex multiplication requires four real-real multiplication operations.

An efficient implementation is assumed, which represents a reasonable ratio between the storage requirements and the computation complexity.

Table 1 lists the required stored words and the required real-real multiplication operations for each calculation step. Furthermore, the variables are calculated for N=26 and L=6.

| Storage requirements | # Stored words | Example: N = 26, L = 6 |
|---|---|---|
| $\alpha = \dfrac{1}{\|a\|^2 - a^H T(T^H T)^{-1} T a}$ | 1 | 1 |
| $g = (T^H T)^{-1} T^H a$ | 8 · 2 (L + 1) | 112 |
| $g_{short} = T_{short}^H a_{short}$ | 8 · 2 (L + 1) | 112 |
| Sum | | 225 |

| Calculation step | # Real-real multiplication | Example: N =26, L = 6 |
|---|---|---|
| 1) $\hat{\theta}_h' = T_{short}^H y_{short}$<br>$T_y = T^H y$ | 2 (L + 1) (N − L) | 280 |
| 2) $\beta = a^H y - g^H T_y$ | 4 (N − L) + 4 (L + 1) | 108 |
| 3) $\hat{\theta}_d' = \alpha \cdot \beta$ | 2 | 2 |
| 4) $\hat{\theta}_h'' = \hat{\theta}_h' - g_{short}\hat{\theta}_d'$ | 4 (L + 1) | 28 |
| Sum | | 418 |

In the step (1), the calculation $\hat{\theta}_h'$ is an intermediate result when $T_y$ is calculated. No multiplication operations for the calculation $\hat{\theta}_h$ are thus counted.

According to Table 1, the method proposed here requires a memory with 225 stored words and 418 real-real multiplication operations, when N=26 and L=6. For these settings, the least square errors method according to DE 101 37 675.8 requires a memory of 512 stored words and 516 real-real multiplication operations. Compared with the latter, the embodiment of the iterative method reduces the storage requirements by more than 50%, and the computation complexity by 18%. The reduced storage requirements are particularly advantageous, since the 512 stored words must be stored for each training sequence.

The algorithm may be implemented in the hardware or in the DSP firmware (digital signal processor). A firmware implementation may be preferable, owing to the complex planning and the number of multiplication and accumulation operations.

The present application describes an iterative method for joint calculation of the maximum likelihood estimated values of the channel coefficients and of the DC offset on the basis of a training sequence (TSC) in a TDMA mobile communications system. One embodiment of the iterative method uses the orthogonality of the TSC sequences in the GSM system for a length of 16 data symbols. This solution does not require storage of the inverse Fisher information matrix of the TSC. However, an accurate estimate of the DC offset is obtained when the TSC part of the received signal is observed over a length of more than 16 data symbols. The estimated value obtained in this way is used on the basis of the monotonal characteristics of the SAGE algorithm in order to improve the accuracy of the channel coefficient estimated values. The advantages of the proposed method are a reduced memory size for the ROM (Read-Only Memory) and a reduction in the computation complexity.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A method for estimation of the channel coefficients ($h_0 \ldots h_L$; $\theta_h$) and of the DC offset (d; $\theta_d$) in a digital baseband signal in a radio receiver using a training sequence, comprising:
   a) generating a received signal vector y from a number of received training sequence data symbols (y(k)) and a number of known training sequence data symbols (t(k));
   b) producing a maximum likelihood estimate of a function $\Lambda(\theta)$ which contains the channel coefficients ($\theta_h$) and the DC offset ($\theta_d$), in such a way that a first likelihood function $Q_h(\theta_h; \hat{\theta}')$ is produced for the channel coefficients ($\theta_h$), and a second likelihood function $Q_d(\theta_d; \hat{\theta}')$ is produced for the DC offset ($\theta_d$); and
   c) using the SAGE algorithm to produce a convergent sequence of expected values of the first and second likelihood functions $Q_h(\theta_h; \hat{\theta}')$ and $Q_d(\theta_d; \hat{\theta}')$, respectively, by means of at least one expected value determination step, and at least one maximization step with a parameter vector $\hat{\theta}'$ comprising initial estimated values of the maximized values $\hat{\theta}_h'$ and $\hat{\theta}_d'$.

2. The method of claim 1, further comprising iterating the expected value determination step and the maximization step until a predetermined convergence criteria is reached.

3. The method of claim 1, wherein the received signal vector y further comprises noise data symbols (n(k)) associated with the received training sequence data symbols (y(k)).

4. The method of claim 1, wherein the function $\Lambda(\theta)$ comprises:

$$\Lambda(\theta) := -(y-A\theta)^H(y-A\theta),$$

wherein y comprises the received signal vector for signal samples of y(k) in the sample interval y(L) ... y(N−1), and $[.]^H$ denotes a conjugate transposition, and wherein the first and second likelihood functions comprise:

$$Q_h(\theta_h; \hat{\theta}') = \frac{1}{2}(\hat{y}_h - T\theta_h)^H(\hat{y}_h - T\theta_h)$$

$$Q_d(\theta_d; \hat{\theta}') = \frac{1}{2}(\hat{y}_d - a\theta_d)^H(\hat{y}_d - a\theta_d),$$

where $$\hat{y}_h = \hat{y} - a\hat{\theta}_d'$$

$$\hat{y}_d = y - T\hat{\theta}_h', \text{ where}$$

$$\hat{\theta}_h'' = (T^H T)^{-1} T^H (y - a\hat{\theta}_d')$$

$$\hat{\theta}_d'' = (a^H a)^{-1} a^H (y - T\hat{\theta}_h'')$$

$$y = [y(L), \ldots, y(N-1)]^T$$

$$a := [e^{-j\Phi L}, \ldots, e^{-j\Phi(N-L)}]^T$$

$$T = \begin{bmatrix} t(L) & \cdots & t(0) \\ \vdots & \ddots & \cdots \\ t(N-1) & \cdots & t(N-L-1) \end{bmatrix}$$

$$A := [T, a]$$

wherein T defines a channel transmission matrix, and a defines a DC offset transmission matrix, and wherein the likelihood functions for $\theta_h$ and $\theta_d$ are maximized in the maximization step.

5. The method of claim 4, wherein the expected value determination step and the maximization step are combined to form the following recursion formulae:

$$\hat{\theta}_h'' = (T^H T)^{-1} T^H (y - a\hat{\theta}_d')$$

$$\hat{\theta}_d'' = (a^H a)^{-1} a^H (y - T\hat{\theta}_h'').$$

6. The method of claim 5, further comprising:
   using the recursion formulae to run through an iteration loop in which an initial value $\hat{\theta}_h'$ is predetermined and a check is carried out after each recalculation of $\hat{\theta}_h''$ and $\hat{\theta}_d''$ to determine whether a convergence has been reached on the basis of predetermined criteria; and
   terminating the iteration process when convergence is reached.

7. The method of claim 5, wherein in the iteration steps, T is replaced by one of its orthogonal matrix elements $T_{short}$ and y is replaced by a corresponding vector element $y_{short}$, such that the first iteration equation is simplified to:

$$\hat{\theta}_h'' = T_{short}^H (y_{short} - a_{short}\hat{\theta}_d')$$
$$= \hat{\theta}_h' - T_{short}^H a_{short}\hat{\theta}_d'.$$

8. The method of claim 7, wherein $$\hat{\theta}_{d'} = \frac{1}{\|a\|^2 - a^H T(T^H T)^{-1} T a} (a^H y - a^H T(T^H T)^{-1} T y).$$

$$\hat{\theta}_h'' = T_{short}^H (y_{short} - a_{short}\hat{\theta}_d')$$

$$= \hat{\theta}_h' - T_{short}^H a_{short}\hat{\theta}_d'$$

is used for the initial estimated values, such that only one iteration step is required for estimation of the channel coefficients.

9. The method of claim 1, wherein the function $\Lambda(\theta)$ and the first and second likelihood functions comprise:

$$\Lambda(\theta) := -(y - A\theta)^H \Pi^{-1}(\hat{y}_n - T\theta_n)$$

$$Q_h(\theta_h; \hat{\theta}') = \frac{1}{2}(\hat{y}_h - T\theta_h)^H \Pi^{-1}(\hat{y}_h - T\theta_h)$$

$$Q_d(\theta_d; \hat{\theta}') = \frac{1}{2}(\hat{y}_d - a\theta_d)^H \Pi^{-1}(\hat{y}_d - a\theta_d),$$

where
$\Pi^{-1}$ is a covariance matrix of a noise vector $N := [n(L), \ldots, n(N-1)]^T$ associated with the training sequence data symbols (y(k)).

* * * * *